No. 750,848. Patented February 2, 1904.

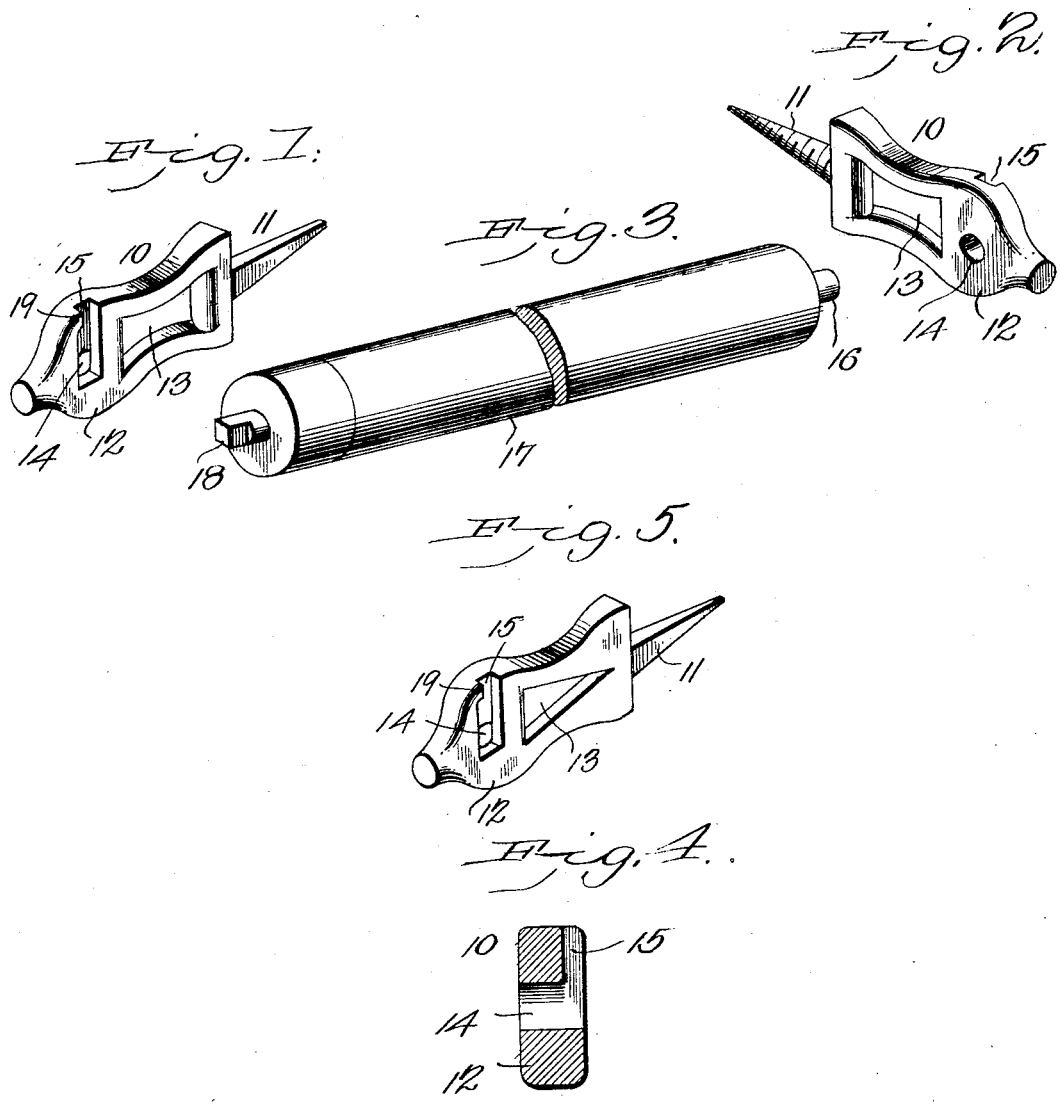

UNITED STATES PATENT OFFICE.

CHARLES H. GUILES, OF ADDISON, NEW YORK.

WINDOW-CURTAIN-ROLLER BRACKET.

SPECIFICATION forming part of Letters Patent No. 750,848, dated February 2, 1904.

Application filed June 17, 1903. Serial No. 161,902. (No model.)

*To all whom it may concern:*

Be it known that I, CHARLES H. GUILES, a citizen of the United States, residing at Addison, in the county of Steuben and State of New York, have invented a new and useful Window-Curtain-Roller Bracket, of which the following is a specification.

This invention relates to means for supporting spring window-curtain rollers upon window-frames, and in rollers of this class one end is provided with a square or flattened stud which must be held from turning and the other end with a circular stud which rotates with the roller, and the supporting means must hold one stud from turning and permit the other to rotate.

Heretofore brackets of different construction have been employed for the opposite ends of the roller, which is often a source of annoyance and inconvenient to apply; and the principal object of the present invention is to produce a bracket which may be employed to support either end of the roller indiscriminately; and the invention consists in certain novel features of the construction, as hereinafter shown and described, and specified in the claims.

In the drawings illustrative of the invention, in which corresponding parts are denoted by like designating characters, Figure 1 is a perspective view of the improved bracket from one side, and Fig. 2 is a similar view from the other side. Fig. 3 represents a perspective view of the curtain-roller with the central portion broken out. Fig. 4 is a cross-section on the line 4 4 of Fig. 1. Fig. 5 is a view similar to Fig. 1, illustrating a slight modification in the construction.

The improved bracket is represented as a whole at 10, with a holding spur 11 at one end and an enlargement 12 at the other end, with an intermediate elongated aperture 13 between the end portions, as shown. The aperture 13 is shown in Fig. 5 V-shaped, with the narrow end toward the spur 11, which will be the preferable form in most cases, as being stronger and affording a better support to the spur and preventing any tendency to bend or crush the connection between the spur and frame, especially when used in hardwood. Formed entirely through the enlarged end 12 is a circular aperture 14, and intersecting this latter aperture is a vertical recess or channel 15, extending only partially through the enlarged portion and opening outwardly therethrough, as shown. The circular aperture 14 is adapted to receive the circular stud 16 of the curtain-roller 17 and permit it to rotate therein, while the channel or recess 15 is adapted to receive the flattened stud 18 at the opposite end of the roller and hold it from turning. The aperture 15 will be formed, preferably, with the slight offset 19 commonly employed in shade-brackets to prevent the accidental displacement of the stud 18, as shown in Figs. 1 and 5.

It will be noted that both ends of the roller are thus suported by brackets which are precisely alike or which are exact duplicates, so that no attention need be paid to them as to whether they are right or left handed; but when a curtain is to be mounted two of the brackets are taken and the spurs driven into the casing at the proper points on each side of the window, the only care required being that the recess 15 on the left side shall face inward and the aperture 14 on the other bracket shall also face inward. The brackets are thus both driven into the casing in exactly the same position and if set with the openings of both of the recesses upward they cannot be wrongly set. This greatly simplifies the hanging of the curtain-roller, as the only labor required is to drive the two spurs into the casing at the required point and inserting the studs 16 18, respectively, into the aperture 14 and recess 15.

If preferred, the spur 11 may be threaded, as shown in Fig. 2; but this would not be a departure from the principle of the invention, as the results produced are the same, the only difference being that one will be connected by rotating the bracket and the other by driving it into position, as above noted.

In detaching the bracket if the unthreaded spur is employed a twisting motion is first imparted to slightly loosen the stud, when it can be readily withdrawn by inserting the claws of a hammer beneath the enlarged "head" 12, or a screw-driver or other similar implement may be inserted through the elongated aperture 13 and used as a twisting and prying force to remove the bracket.

When the spur is threaded, of course a mere reversal of the motion will release the bracket.

The brackets may be manufactured in any required size to correspond to the various sizes of rollers and may be of any suitable metal and in any fanciful design and plated, japanned, or otherwise protected or coated.

It will be noted that the only aperture necessary to secure the bracket is the comparatively small one made by the spur, which will not thus materially mar the casing, and when the bracket is to be removed no marring of the casing will occur, as the removing implements will not require to touch the casing, but engage the bracket only, which is of great importance in devices of this character.

Having thus described the invention, what I claim is—

1. A window-shade bracket having an angular recess on one side extending from the edge of the bracket through a portion of its width, and a circular aperture extending transversely through said bracket and intersecting said angular recess to provide for the use of said bracket with either end of a shade-roller.

2. A window-shade bracket having a spur extending longitudinally from one end with the other end enlarged and having an angular recess extending from one edge of said bracket through the greater portion of its width, and a circular aperture extending from said recess transversely through said bracket.

3. A window-shade bracket formed from a single piece of metal having a spur projecting from one end with the other end enlarged and terminating in a blunt point to receive the impact of a hammer and having a recess extending from one edge of said bracket through the greater portion of its width and having a circular aperture extending from said recess transversely through said bracket, said bracket having a V-shaped longitudinal aperture formed intermediately of its ends with the point thereof extending toward the spur-carrying end to provide a reliable and strong support for the spur and to lighten the bracket.

In testimony that I claim the foregoing as my own I have hereto affixed my signature in the presence of two witnesses.

CHARLES H. GUILES.

Witnesses:
   JOHN G. HINMAN,
   F. H. KINNY.